US012682605B2

(12) United States Patent
Babagholami Mohamadabadi et al.

(10) Patent No.: US 12,682,605 B2
(45) Date of Patent: Jul. 14, 2026

(54) SYSTEMS, METHODS, AND APPARATUS FOR IMAGE CLASSIFICATION WITH DOMAIN INVARIANT REGULARIZATION

(71) Applicant: Samsung Electronics Co., Ltd., Suwon-si (KR)

(72) Inventors: Behnam Babagholami Mohamadabadi, Escondido, CA (US); Mostafa El-Khamy, San Diego, CA (US); Kee-Bong Song, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 520 days.

(21) Appl. No.: 17/945,073

(22) Filed: Sep. 14, 2022

(65) Prior Publication Data

US 2023/0104127 A1     Apr. 6, 2023

Related U.S. Application Data

(60) Provisional application No. 63/252,142, filed on Oct. 4, 2021.

(51) Int. Cl.
*G06V 10/764*     (2022.01)
*G06V 10/778*     (2022.01)

(52) U.S. Cl.
CPC .......... *G06V 10/764* (2022.01); *G06V 10/778* (2022.01)

(58) Field of Classification Search
CPC .. G06V 10/764; G06V 10/778; G06V 10/774; G06F 18/10; G06F 18/214; G06F 18/24; G06F 18/253; G06N 20/00
See application file for complete search history.

(56) References Cited

U.S. PATENT DOCUMENTS

| | | | |
|---|---|---|---|
| 11,080,886 B2 * | 8/2021 | Kicanaoglu ............ | G06V 10/82 |
| 2021/0012181 A1 | 1/2021 | Zhu et al. | |
| 2021/0232803 A1 * | 7/2021 | Fu ........................ | G06N 3/0455 |
| 2021/0264236 A1 | 8/2021 | Xu et al. | |
| 2022/0012530 A1 | 1/2022 | Singh et al. | |
| 2022/0092728 A1 | 3/2022 | Hsiao | |
| 2022/0147768 A1 * | 5/2022 | Thermos .................. | G06N 3/09 |
| 2022/0156987 A1 | 5/2022 | Chandran et al. | |

OTHER PUBLICATIONS

"Yufei Wang et. al., Variational Disentanglement for Domain Generalization, Sep. 2021, Computer Vision and Pattern Recognition" (Year: 2021).*

(Continued)

*Primary Examiner* — Chineyere Wills-Burns
*Assistant Examiner* — Phuong Hau Cai
(74) *Attorney, Agent, or Firm* — Renaissance IP Law Group LLP

(57) ABSTRACT

A system and a method are disclosed for receiving an input image, using a domain invariant machine learning model to compute an output based on the input image, wherein the domain invariant machine learning model is trained using domain invariant regularization, and displaying information based on the output. Training using domain invariant regularization may include use of a loss function.

20 Claims, 9 Drawing Sheets

(56)          References Cited

OTHER PUBLICATIONS

"Seogkyu Jeon et al., Feature Stylization and Domain-aware Contrastive Learning for Domain Generalization, Aug. 2021, ACM MM 2021, Computer Vision and Pattern Recognition" (Year: 2021).*

"Ananya Harsh Jha et al., Disentangling Factors of Variation with Cycle-Consistent Variational Auto-Encoders, 2018, Proceedings of the European Conference on Computer Vision (ECCV), 2018, pp. 805-820" (Year: 2018).*

"Patrice Y. Simard et al., Transformation Invariance in Pattern Recognition—Tangent Distance and Tangent Propagation, 1998, Neural Networks: Tricks of the Trade, LNCS 1524, pp. 239-274" (Year: 1998).*

"Jiawei Chen et al., A Cyclically-Trained Adversarial Network for Invariant Representation Learning, 2020, Proceedings of the IEEE/CVF Conference on Computer Vision and Pattern Recognition CVPR Workshops, pp. 782-783" (Year: 2020).*

Peng, Xingchao, et al., "Moment Matching for Multi-Source Domain Adaptation," Proceedings of the IEEE/CVF International Conference on Computer Vision (ICCV), 2019, pp. 1406-1415.

Zhang, Hongyi, et al., "mixup: Beyond Empirical Risk Minimization," arXiv preprint arXiv:1710.09412v2, Apr. 2018, 13 pages.

Hendrycks, Dan et al., "AugMix: A Simple Data Processing Method to Improve Robustness and Uncertainty," arXiv:1912.02781v2 [stat. ML] Feb. 17, 2020, 15 pages.

Sun, Baochen et al., "Return of Frustratingly Easy Domain Adaptation," Proceedings of the Thirtieth AAAI Conference on Artificial Intelligence (AAAI-16), 2016, pp. 2058-2065.

* cited by examiner

100

200

300

SYSTEMS, METHODS, AND APPARATUS FOR IMAGE CLASSIFICATION WITH DOMAIN INVARIANT REGULARIZATION

CROSS-REFERENCE TO RELATED APPLICATION

This application claims the priority benefit under 35 U.S.C. § 119(e) of U.S. Provisional Application No. 63/252,142, filed on Oct. 4, 2021, the disclosure of which is incorporated by reference in its entirety as if fully set forth herein.

TECHNICAL FIELD

The disclosure generally relates to image classification. More particularly, the subject matter disclosed herein relates to improvements to systems, methods, and apparatus for image classification with domain invariant regularization.

SUMMARY

A machine learning model for image classification may be trained using images from one or more source domains, each of which may have corresponding domain-specific features such as styles, lighting conditions, textures, and/or the like. The model may perform well when used to classify images from the same domain or domains on which it was trained, but it may perform poorly when used to classify images from a new target domain that was not used for training. For example, images from a new target domain may have style discrepancies that may result in a domain shift between the source domain(s) and the target domain which may lead to performance degradation.

To solve this problem, a domain adaptation (DA) technique may use data from one or more source domains and a target domain to generate a feature space that is invariant to domains but retains discriminative class information that may be used for classification. This may enable a machine learning model to learn domain invariant features that may be used to classify images from either a source domain or the target domain. One issue with this approach is that it involves the use of images from the target domain to train the model. Thus, a DA technique may not be used to train a machine learning model to classify images from a domain that is not available during training.

In another approach, a domain generalization (DG) technique may train a machine learning model using images from diverse source domains in an attempt to learn a domain invariant feature representation that may be used to classify images in a new target domain. One issue with this approach is that, as the source domains become more diverse, training the model may become more difficult because each domain may contain domain-specific information that may be difficult to separate from domain invariant features.

To overcome these issues, systems and methods are described herein for using and training a machine learning model using domain invariant regularization techniques in which training images having disentangled content-specific and domain-specific feature spaces may be used to train the model to be invariant to domain-specific features. This may be achieved, for example, by using a domain invariant regularization loss function to train the model to compute similar outputs for training images that have the same content-specific features but different domain-specific features. The training images may be generated, for example, using a generative model that may perturb a domain-specific feature of an image from a source domain to create a new image. This may be achieved, for example, by combining a content-specific feature of the source image with a randomly selected style-specific feature. The generative model may be trained using a multi-domain image-to-image translation network in which a classifier may be trained to classify source images and then used to train the generative model to generate domain-translated images having the same class as the source images.

The above approaches improve on previous systems and methods because they may improve the generalization performance of a classification model across domains, including domains that are not available during training.

In an embodiment, a method comprises: receiving an input image; using a domain invariant machine learning model to compute an output based on the input image, wherein the domain invariant machine learning model is trained using domain invariant regularization; and displaying information based on the output.

In an embodiment, a system comprises: one or more processors; and a memory storing instructions which, when executed by the one or more processors, causes a domain invariant machine learning model to compute an output based on an input image, wherein the domain invariant machine learning model is trained using domain invariant regularization.

In an embodiment, a method of training a machine learning model comprises: receiving a plurality of input images; generating a plurality of perturbed input images based on the plurality of input images' and training the machine learning model to be domain invariant using the plurality of input images and the plurality of perturbed input images.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
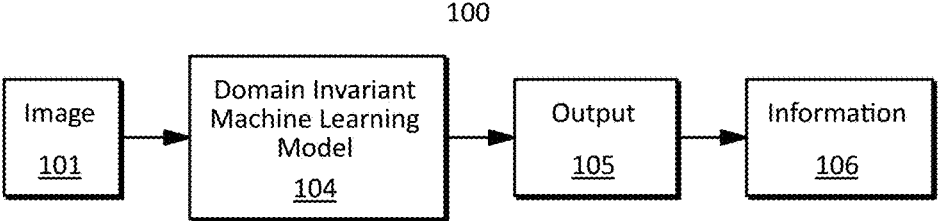
FIG. 1 depicts a machine learning system according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purposes only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 depicts a machine learning system according to an embodiment. The system 100 depicted in FIG. 1 may receive one or more input images 101 that may be applied to a domain invariant machine learning model 104. The domain invariant machine learning model 104 may compute one or more outputs 105 based on the one or more input images 101.

The domain invariant machine learning model 104 may be trained, for example, using domain invariant regularization (DIR). Domain invariant regularization may use training images with domain-specific features from multiple domains to train the domain invariant machine learning model 104 to reduce or eliminate the variability of the output 105 to the domain-specific features of the training images.

The one or more outputs 105 may be in the form of, for example, a classification (e.g., a class label for an input image or a portion thereof, a probability that an input image or a portion thereof belongs to a class, and/or any other type of classification output), a feature identified in an input image (e.g., a type of feature, a location of a feature, and/or the like), a regression output (e.g., a discrete or continuous value that may represent, for example, a characteristic of an input image or a portion thereof), or any other type of machine learning output, or combination thereof.

The system 100 may display information 106 based on the one or more outputs 105. For example, if an output 105 is a classification, the information 106 may include a class label for an input image 101, or a portion thereof, for which the domain invariant machine learning model 104 computed the output 105. As another example, if an output 105 is a classification, the information 106 may include a probability that an input image 101, or a portion thereof, may belong to a class. As a further example, if an output 105 is a classification that may be used for selecting or filtering one or more content-specific features of an input image 101, the information 106 may include the input image 101 (e.g., if the input image 101 passes the selection or filtering process) or a substitute image, notification, warning, and/or the like (e.g., if the input image 101 fails the selection or filtering process).

Figure 10:
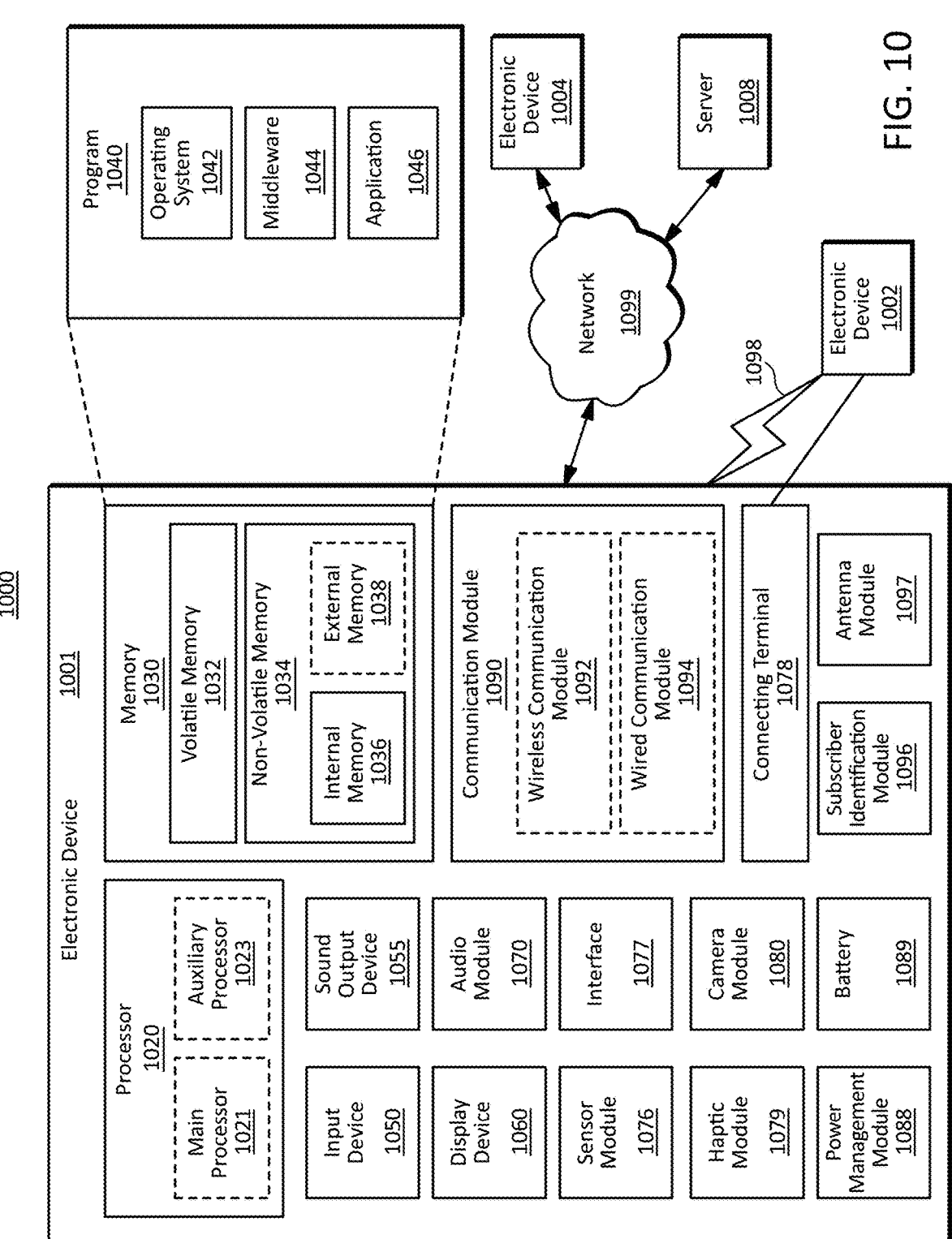
FIG. 10 is a block diagram of an electronic device in a network environment 1000, according to an embodiment.

The system depicted in FIG. 1 may be used, for example, for any type of machine learning image processing application such as with the electronic device described with respect to FIG. 10.

Figure 2:
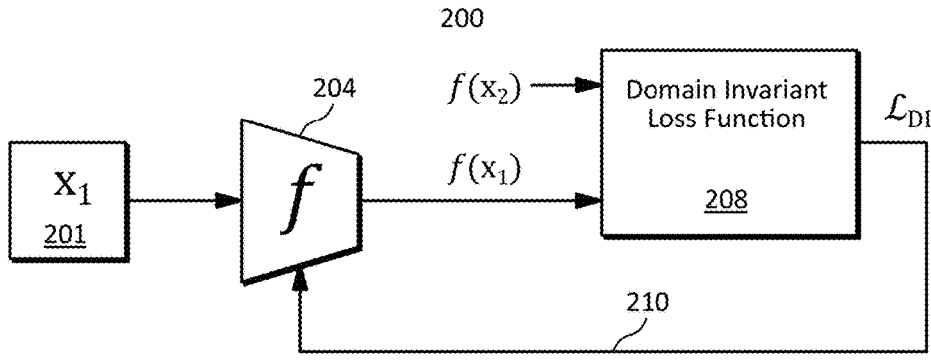
FIG. 2 depicts a system for training a machine learning model to be domain invariant according to an embodiment.

FIG. 2 depicts a system for training a machine learning model to be domain invariant according to an embodiment. The system 200 depicted in FIG. 2 may be used, for example, to train the domain invariant machine learning model 104 shown in FIG. 1, or any other embodiment disclosed herein.

Referring to FIG. 2, the system 200 may include a machine learning model 204 that may compute an output $f(x_1)$ based on a first training image 201 which may be referred to as $x_1$. The output $f(x_1)$ may be applied as an input to a domain invariant regularization loss function 208 (which may also be referred to as a DIR loss function or a domain invariant loss function). The domain invariant loss function may determine a domain invariant regularization loss $\mathcal{L}_{DI}$ (which may also be referred to as a DIR loss or a domain invariant loss). The domain invariant loss $\mathcal{L}_{DI}$ may be used to provide training feedback 210 to the machine learning model 204, for example, using gradient descent, backpropagation, and/or the like to update (e.g., modify) one or more parameters such as weights, hyperparameters, and/or the like of the machine learning model 204.

The domain invariant loss function 208 may also receive a second input $f(x_2)$ which may be generated based on a second training image that may be referred to as $x_2$. The second input $f(x_2)$ to the domain invariant loss function 208 may be computed by the same machine learning model 204 as the first input $f(x_1)$ or a different machine learning model.

The first training image $x_1$ may include a content-specific (e.g., category related) feature and a domain-specific (e.g., style related) feature. The second training image $x_2$ may include a content-specific feature that is the same as, or similar to, the content-specific feature of the first training image $x_1$ but a domain-specific feature that is different from the domain-specific feature of the first image $x_1$. The content-specific features and the domain-specific features may be disentangled. Thus, the first training image $x_1$ and the second training image $x_2$ may preserve content across different domains, thereby enabling the domain invariant loss function 208 to be used to train the machine learning model 204 to be domain invariant.

In an embodiment, the domain invariant loss function 208 may be implemented using one or more expectation functions, distance functions, and/or the like. For example, the inputs $f(x_1)$ and $f(x_2)$ to the domain invariant loss function 208 may be implemented as probabilities and/or probability vectors, and the domain invariant loss $\mathcal{L}_{DI}$ may be computed using an expectation function $\mathbb{E}$ (e.g., based on a probability distribution of the second training image $x_2$), and a distance function $\mathbb{D}$ (e.g., based on a distance between the inputs $f(x_1)$ and $f(x_2)$ to the domain invariant loss function 208).

Figure 3:
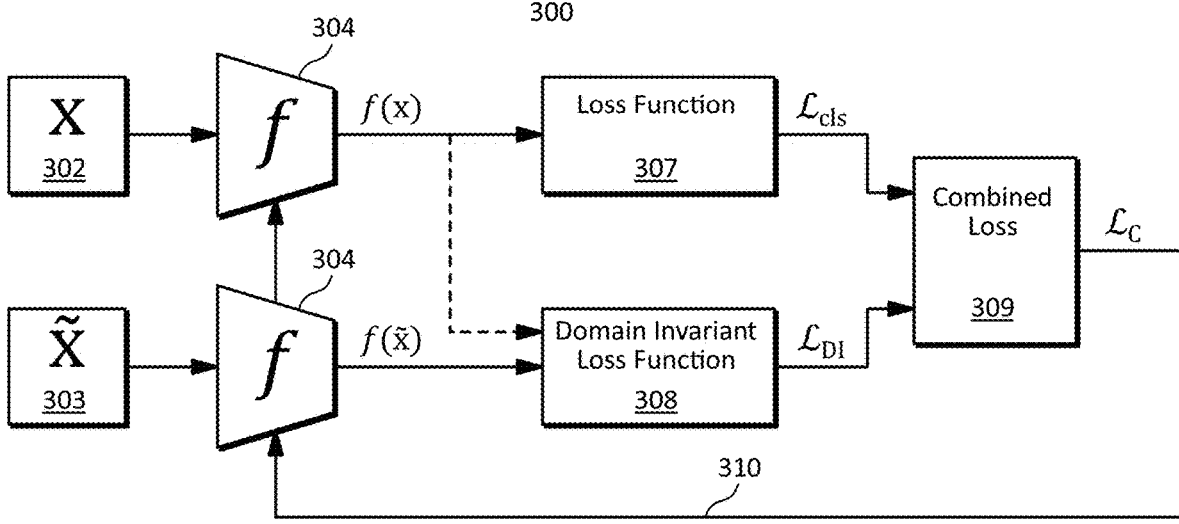
FIG. 3 depicts another system for training a machine learning model to be domain invariant according to an embodiment.

FIG. 3 depicts another system for training a machine learning model to be domain invariant according to an embodiment. The system 300 depicted in FIG. 3 may be used, for example, to implement either of the systems 100 or 200 discussed above or any other embodiment disclosed herein.

Referring to FIG. 3, the system 300 may include a machine learning model 304 that may compute a first output $f(x)$ based on a first training image 302 which may be referred to as x. A machine learning model 304 may also compute a second output $f(\tilde{x})$ based on a second training image 303 which may be referred to as $\tilde{x}$. The first and second training images x and 1 may be from first and second source domains, respectively. The machine learning model 304 is depicted multiple times in FIG. 3 to illustrate its use with the different training images 303 and 302.

The first output $f(x)$ may be applied as an input to a first loss function 307 which may be implemented, for example, using a cross entropy loss function as shown in FIG. 3. The second output $f(\tilde{x})$ may be applied as an input to a second loss function 308 which, in this embodiment, may be implemented using a domain invariant loss function as shown in FIG. 3. In some implementations, the first output $f(x)$ may also be applied as an input to the domain invariant loss function 308. In an embodiment, the domain invariant loss function 308 may be implemented using one or more expectation functions, distance functions, and/or the like in a manner similar to the domain invariant loss function 208 depicted in FIG. 2.

Referring to FIG. 3, a combined loss function 309 may receive the cross-entropy loss $\mathcal{L}_{cls}$ from the first loss function 307 and a domain invariant loss $\mathcal{L}_{DI}$ from the domain invariant loss function 308 and combine them to generate a combined loss $\mathcal{L}_C$ as follows:

$$\mathcal{L}_C = \mathcal{L}_{cls} + \lambda \mathcal{L}_{DI} \qquad (1)$$

where $\lambda$ may control the contribution of the domain invariant loss $\mathcal{L}_D$ relative to the cross-entropy loss $\mathcal{L}_{cls}$. The combined loss $\mathcal{L}_C$ may be used to provide training feedback 310 to the machine learning model 304, for example, using gradient descent, backpropagation, and/or the like to update (e.g., modify) one or more parameters such as weights, hyperparameters, and/or the like of the machine learning model 304.

In an embodiment, the second training image $\tilde{x}$ may be generated by perturbing the first training image x. For example, x may have a content-specific feature and a disentangled domain-specific feature from a first source domain. The second training image $\tilde{x}$ may be generated by combining the content-specific feature of x with a domain-specific feature from a different source domain, thereby preserving content while changing the source domain of the second training image $\tilde{x}$.

Applying the first and second training images x and $\tilde{x}$ to the machine learning model 304 and constraining $f(x)$ and $f(\tilde{x})$ to be consistent over x and $\tilde{x}$ by using the domain invariant loss function 308 may cause the output $f(\tilde{x})$ for the generated training image $\tilde{x}$ in the second source domain to be close to the output $f(x)$ for the original training image x in the first source domain, thereby training the machine learning model 304 to be domain invariant. Thus, for example, the machine learning model 304 having a classifier function $f$ may be trained to be a domain invariant machine learning model $f^*$ as follows:

$$f^* = \underset{f}{\arg\min} \, \mathcal{L}_C \qquad (2)$$

where $\mathcal{L}_C$ may be a combined loss including the cross-entropy loss $\mathcal{L}_{cls}$ and the domain invariant loss $\mathcal{L}_{DI}$ as shown in Eq. (1). In such an embodiment, the parameter $\lambda$ in Eq. (1) may operate, for example, as a hyper-parameter to control a trade-off between the prediction accuracy of the machine learning model 304 on the original training image x and the consistency of the machine learning model 304 with the generated training image $\tilde{x}$.

Figure 4A:
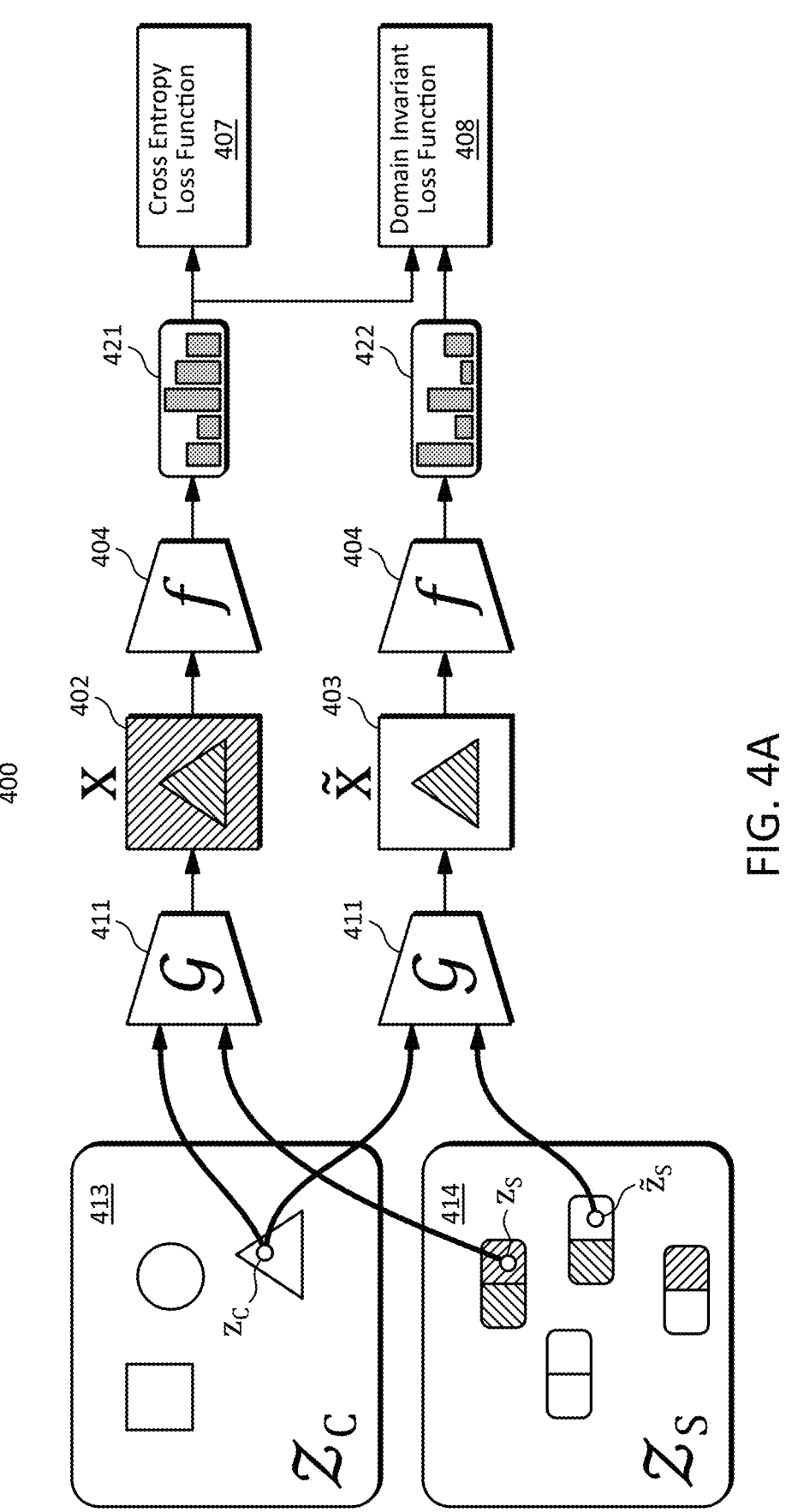
FIG. 4A depicts a system for generating training images and training a machine learning model to be domain invariant according to an embodiment.
Figure 4B:
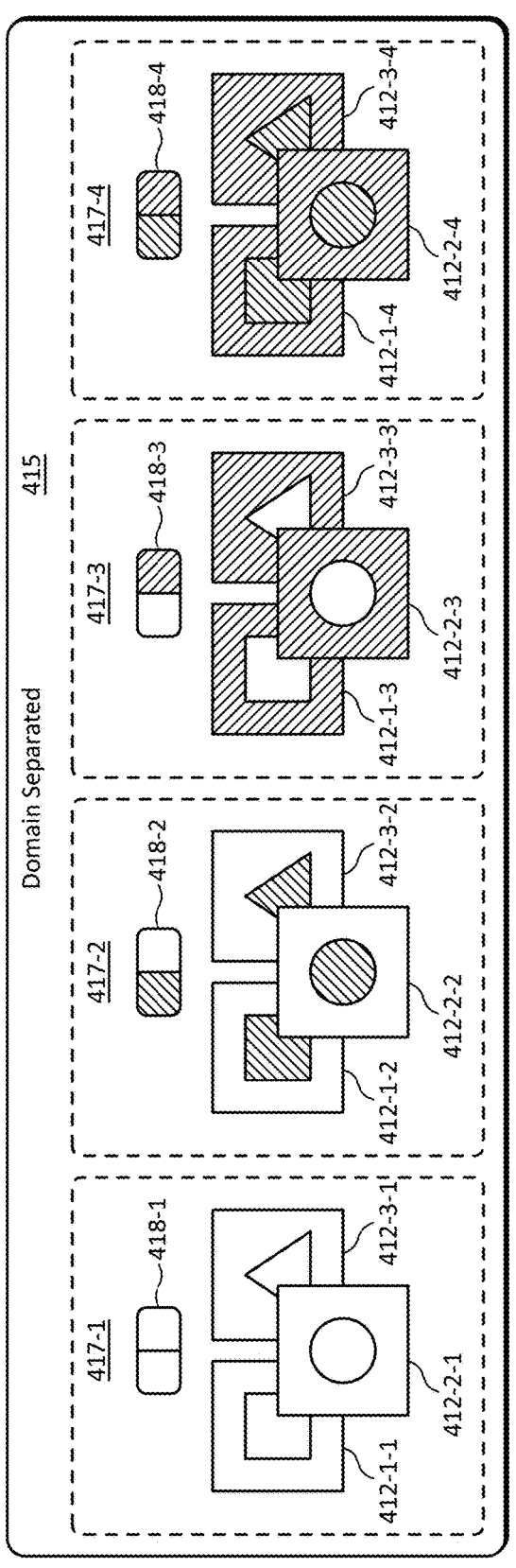
FIG. 4B depicts training images that may be used with the system depicted in FIG. 4A.

FIG. 4A depicts a system for generating training images and training a machine learning model to be domain invariant according to an embodiment. FIG. 4B depicts training images that may be used with the system depicted in FIG. 4A. FIGS. 4A and 4B may be referred to individually and/or collectively as FIG. 4.

Figure 4B:
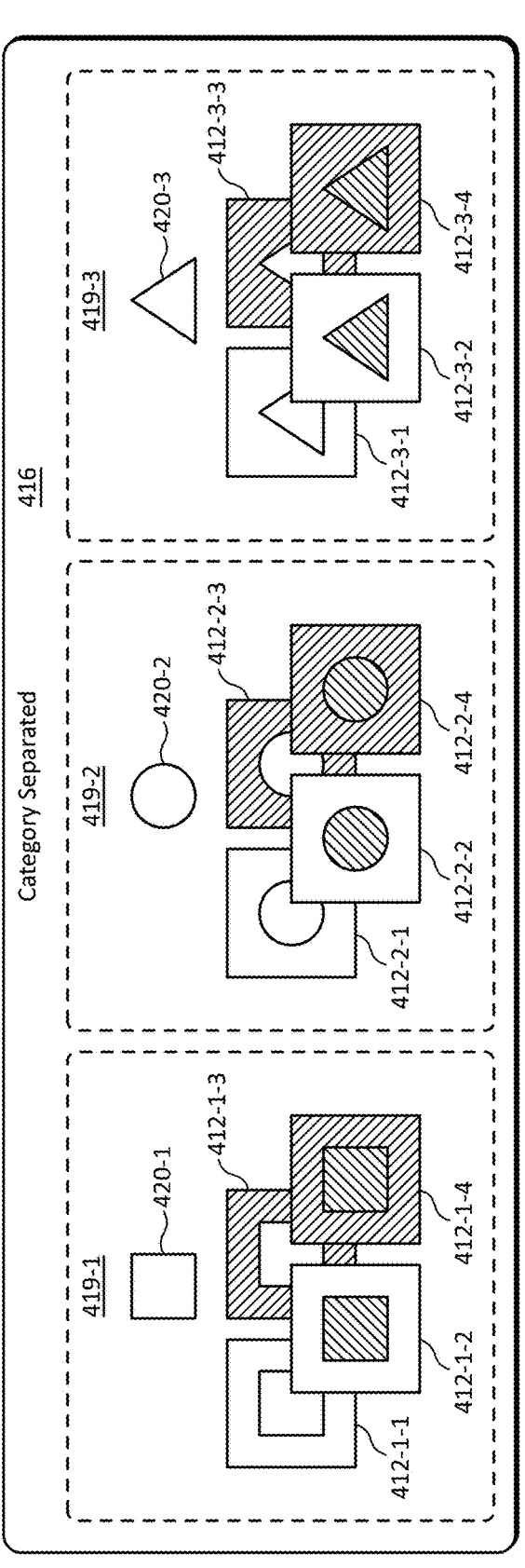

The system 400 depicted in FIG. 4 may be used, for example, to implement any of the systems 100, 200, or 300 discussed above or any other embodiment disclosed herein. For purposes of illustrating some of the inventive principles, the system 400 may be described as implementing a domain invariant regularizer based on deep generative image models and using a machine learning model implemented as a classifier. The system 400, however, is not limited to these or any other implementation details disclosed in FIG. 4.

The system 400 may include a generator model 411 and a classifier 404. The classifier 404 is depicted multiple times in FIG. 4 to illustrate its use with different training images such as training images 402 and 403. The generator model 411 is depicted multiple times in FIG. 4 to illustrate its use to generate the different training images 402 and 403. The generator model 411 may be implemented with more than one generator model, for example, with multiple instances of the same training model.

The system 400 may exploit a latent space for the generator model 411 utilizing training images from multiple source domains to capture latent domain-specific features of the training images. The classifier 404 may implement a classification function $f$ and may be trained to be invariant to such domain-specific features (e.g., using a domain invariant loss function 407), thereby making the classifier 404 more robust, for example, when used to classify images from a new domain.

The generator model 411 may generate training images 402 and 403 based on an underlying latent feature space $\mathcal{Z} = \mathcal{Z}_C \times \mathcal{Z}_S$ that may be a product space of two subspaces: (i) a content-specific feature space $\mathcal{Z}_C$ (indicated as element 413) that may include semantic (e.g., subject-related content) information (e.g., content-specific features $z_C \in \mathcal{Z}_C$); and (ii) a style-specific feature space $\mathcal{Z}_S$ (indicated as element 414) that may include domain-related (e.g., style) information (e.g., style-specific features $z_S \in \mathcal{Z}_S$).

The content-specific feature space $\mathcal{Z}_C$ and the style-specific feature space $\mathcal{Z}_S$ may be disentangled such that style changes to an image may preserve the content of the image. For example, when classifying images to discriminate cats versus elephants, different parts of the animals may constitute content, whereas, color, texture, background, lighting conditions, camera lens characteristics, illumination, contrast, saturation, image quality, and/or the like may constitute style.

The generator model 411 may implement a generator function $\mathcal{G} : \mathcal{Z} \rightarrow \mathcal{X}$ that may map features from the underlying latent feature space $\mathcal{Z}$ to a data (e.g., image) space $\mathcal{X}$. During inference operation of the classifier 404, content-related features may be relevant to the classification task whereas style-related features may be irrelevant. Thus, a domain invariant regularization loss function may be used to enforce the classification function $f$ of the classifier 404 to be invariant to the underlying style-specific features of the input images. In the system 400, this may be accomplished, for example, by (1) using training images that may be generated by replacing a style-specific feature $z_S$ of a sample image x with a new randomly selected style-specific feature $z_S \in \mathcal{Z}_S$ to create a new image $\tilde{x} = \mathcal{G}(z_C, \tilde{z}_S)$ in a different style where $z_C$ denotes the content-specific feature of the original image x; and (2) constraining (e.g., encouraging or enforcing) the classification function $f$ of the classifier 404 to be consistent over x and $\tilde{x}$.

Referring to FIG. 4B, training images that may be generated by the generator model 411 are indicated as 412-_m-n_ where m indicates a content-specific feature and n indicates a style-specific feature. For content-specific features, m=1 indicates a square, m=2 indicates a circle, and m=3 indicates a triangle. For a style-specific features, n=1 indicates no shading, n=2 indicates a shaded object, n=3 indicates a shaded background, and n=4 indicates a shaded object and a shaded background. Thus, for example, 412-1-2 indicates a training image having the shape of a square for content and a shaded object as the style. The training images indicated as 412-_m-n_ may be referred to individually and/or collectively as 412. The training images 412 may also be referred to as source images, source samples, source data, training data, training samples, and/or the like. The content-specific features and style-specific features depicted in images 412 are for purposes of illustrating the inventive principles. In other embodiments, the content-specific features may include any content, for example, guitars, elephants, houses, horses, birds, etc., and the style-specific features may include any domain-specific features including, for example, styles such as sketch, line drawing, photo (real), cartoon, clip art, painting, etc.

In FIG. 4B, the training images 412 are shown in a first arrangement 415 in which the training images 412 are grouped by style-specific features (e.g., domain separated) and a second arrangement 416 in which the training images 412 are grouped by content-specific features (e.g., category separated).

Each group in the domain separated arrangement 415 is indicated as 417-_n_ and the corresponding style is represented by a rounded rectangle 418-_n_, where n uses the same style indicators as the training images 412. For example, in the domain separated arrangement 415, group 417-1 includes training images 412-1-1, 412-2-1, and 412-3-1 which have style n=1 (shaded object) which is represented by a rounded rectangle 418-1.

Each group in the category separated arrangement 416 is indicated as 419-_m_ and the content is represented by a shape 420-_m_, where in uses the same content indicators as the training images 412. For example, in the category separated arrangement 416, group 419-1 includes training images

412-1-1, 412-1-2, 412-1-3, and 412-1-4 which have content m=1 (square object) which is represented by a square 420-1.

The rounded rectangles 418-n in FIG. 4B are used to represent styles in the style-specific feature space $\mathcal{Z}_S$ in FIG. 4A, and the shapes 420-m in FIG. 4B are used to represent content in the content-specific feature space $\mathcal{Z}_C$ in FIG. 4A.

Referring to FIG. 4A, the generator model 411 may combine a content-specific feature $z_C$ from content-specific feature space $\mathcal{Z}_C$ with a style-specific feature $z_S$ from style-specific feature space $\mathcal{Z}_S$ to generate a first training image x indicated as 402. In this example, the content-specific feature $z_C$ is a triangle (m=3), and the style-specific feature $z_S$ is shaded object and shaded background (n=3). The first training image x may be applied to the classifier 404 which may compute an output (e.g., class prediction) $f(x)$ that, in this example, may be implemented as a probability vector 421.

To generate a second training image, the generator model 411 may combine the same content-specific feature $z_C$ used for the first training image x with a different (e.g., randomly selected) style-specific feature $\tilde{z}_S$ from style-specific feature space $\mathcal{Z}_S$ to generate a new image $\tilde{x}$ indicated as 403. In this example, the style-specific feature $\tilde{z}_S$ is shaded object (n=1). Thus, a second training image $\tilde{x}$ indicated at 403 includes the triangle content of the first training image x but in the shaded object style. The second training image $\tilde{x}$ may be applied to the classifier 404 which may compute an output (e.g., class prediction) $f(\tilde{x})$ that, in this example, may be implemented as a probability vector 422.

The classifier output $f(x)$ based on the first training image x may be applied to a cross-entropy loss function 407 to compute a cross-entropy loss $\mathcal{L}_{cls}$. The classifier output $f(\tilde{x})$ based on the second training image $\tilde{x}$ may be applied to a domain invariant regularization loss function 408. In some implementations, the classifier output $f(x)$ based on the first training image x may also be applied to the domain invariant regulation loss function 408 which may compute a domain invariant regularization loss $\mathcal{L}_{reg}$ based on the classifier outputs $f(x)$ and $f(\tilde{x})$. In some implementations, the cross-entropy loss $\mathcal{L}_{cls}$ and domain invariant regularization loss $\mathcal{L}_{reg}$ may be combined, for example, as follows:

$$\mathcal{L}_C = \mathcal{L}_{cls} + \lambda \mathcal{L}_{reg} \qquad (3)$$

to generate a combined loss $\mathcal{L}_C$ in a manner similar to Eq. (1). The combined loss $\mathcal{L}_C$ may be used to provide training feedback to the classifier 404, for example, using gradient descent, backpropagation, and/or the like to train the classifier 404 to be invariant to style-specific feature $\tilde{z}_S$ in the training images.

Thus, the system 400 may implement domain invariant regularization by combining a training image's underlying content-specific (category related) feature $z_C$ with randomly selected style-specific (domain related) features $\tilde{z}_S \in \mathcal{Z}_S$ and enforcing the classifier's prediction $f(\tilde{x})$ for generated training images $\tilde{x}$ to be close to $f(x)$ through the use of a domain invariant regularization loss function 408.

Figure 5:
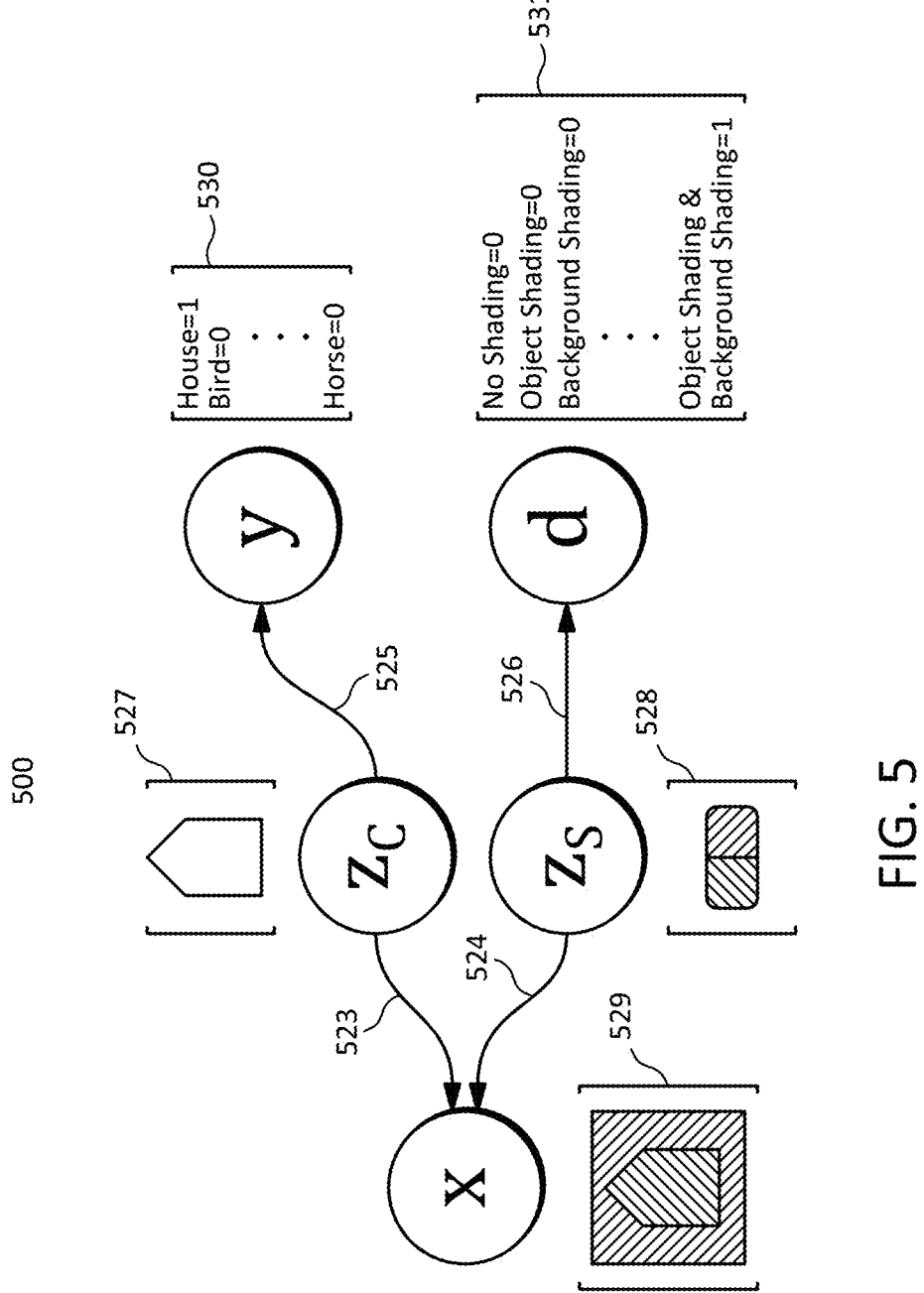
FIG. 5 depicts a causal graph illustrating relationships between content-specific features, style-specific features, categories, and domains according to an embodiment.

FIG. 5 depicts a causal graph illustrating relationships between content-specific features, style-specific features, categories, and domains according to an embodiment. The graph 500 depicted in FIG. 5 may be used with the systems 100, 200, 300, and/or 400 discussed above or any other embodiment disclosed herein to analyze the systems, formulate operations for the system, and/or the like.

A domain generalization technique according to an embodiment may involve the use of data (e.g., independent and identically distributed (i.i.d.) data) from S source domains $\{D_1, \ldots, D_S\}$ to train a classifier having a classification function $f$ to generalize well to one or more new (e.g., previously unseen) target domains where no data about a target domain is available during training (which may be referred to as out-of-domain generalization), as well as new data from existing domains that have been used to train the classifier (which may be referred to as (in-domain generalization). Training a robust predictive model (e.g., a classifier) having a classification function $f$ to be invariant across different domains with different data distributions according to an embodiment may involve exploiting one or more statistical invariances across training and test domains to incorporate such invariances into $f$.

For example, a generative model may exploit a disentangled latent space having a latent subspace (which may also be referred to as a space) that is domain invariant. The generative model may have two independent sources of variation: (1) a style-specific latent space $z_S \in \mathcal{Z}_S$ containing domain-related information for input data (e.g., training images); and a content-specific latent space $z_C \in \mathcal{Z}_C$ containing semantic (e.g., subject-related content) information for input data. A generator may implement a model $\mathcal{G}: \mathcal{Z} \rightarrow \mathcal{X}$ that may map features from a latent feature space $\mathcal{Z} = \mathcal{Z}_C \times \mathcal{Z}_S$ to a data (e.g., image) space X. For a classification task that may predict a label y for a data point x, a content-specific feature $z_C$ may be relevant, while a style-specific feature $z_S$ may be irrelevant. This may be illustrated, for example, by the causal relationships between an input data sample (e.g., an image) having the form (x, y, and d) and its latent features depicted in FIG. 5 (where d indicates a target domain).

Referring to FIG. 5, data x, category label y, and target domain d are observed variables. A content-specific feature $z_C$ is illustrated as a house 527, a style-specific feature $z_S$ is illustrated as a style 528 having a shaded object and shaded background, and the observed data x is illustrated as a house 529 rendered in the style 528. The category label y is illustrated as being a house (=1) from of a vector 530 of possible categories including a bird (=0) and a horse (=0). The domain label d is illustrated as being a style having a shaded object and shaded background (=1) out of a vector 531 of possible domains (e.g., styles) including shaded object (=0), shaded background (=0), and solid object (=0).

The directed arrow 523 from $z_C$ to the observed data x (e.g., an image) and the directed arrow 524 from $z_S$ to the observed data x indicate that x may be generated based on content and style. The directed arrow 525 from $z_C$ to the class label y indicates that content (e.g., shape) $z_C$ may influence the class label y, while the absence of a directed arrow from $z_S$ to the class label y indicates that style does not influence the class label y. (In some implementations, one or more style features may be correlated to class labels, but not causally related to them). Thus, the content-specific feature $z_C$ may include the information used to predict y (e.g., all of the information needed to predict y).

Similarly, the directed arrow 526 from the style-specific feature $z_S$ to the domain label d indicates that style $z_S$ may influence the domain label d, while the absence of a directed arrow from $z_C$ to the domain label d indicates that content does not influence the domain label d. Thus, the style-specific feature $z_S$ may include the information used to determine the domain d. Moreover, in some implementations, the absence of a directed path between $z_C$ and $z_S$ may indicate that $z_C$ and $z_S$ are marginally independent (e.g., $z_C$

11

$\downarrow z_S$). Thus, only the content-specific feature $z_C$ may be regarded as a plausible feature for predicting y.

Based on the causal relationships illustrated in FIG. 5, training a classifier to be robust against spurious domain-specific features $z_S$ associated with class labels may improve classifier generalization to new (e.g., unseen) target domains. This may be expressed, for example, using conditional independence as follows. For a given input data sample (e.g., image) x=$\mathcal{G}$ ($z_C$,$z_S$) with $z_C \in \mathcal{Z}_C$ and $z_S \in \mathcal{Z}_S$, and its corresponding label y:

$$\mathbb{P}_{(y|z_C,z_S)} = \mathbb{P}_{(y|z_C)}. \tag{4}$$

Thus, given an input image x, manipulating its style feature $z_S$ does not influence its class label. Hence, an invariant classifier $f^*$ that outputs a probability distribution over the class label space $\mathcal{Y}$ may be consistent with an invariance relationship:

$$f^*(\mathcal{G}_{(z_C,z_S)})=f^*(\mathcal{G}_{(z_C,\tilde{z}_S)}), \forall \tilde{z}_S \in \mathcal{Z}_S. \tag{5}$$

In some implementations, this relationship may be used to achieve domain invariant prediction, for example, by explicitly enforcing invariance under style perturbations through the use of a domain-invariant regularization. For example, a domain invariant regularization loss function may compute a domain invariant regularization loss $\mathcal{L}_{reg}$ as follows:

$$\mathcal{L}_{reg}=\mathbb{E}_{x\sim\mathbb{P}(x)}\mathbb{E}_{d\sim\mathbb{P}(d)}\mathbb{E}_{u\sim\mathcal{N}(0,I)}[\mathbb{D}(f(x),f(\tilde{x}))],$$

$$\tilde{x}=\mathcal{G}_{(z_C,\tilde{z}_S)}, z_C=\mathcal{F}(x), \tilde{z}_S=\mathcal{T}(d,u). \tag{6}$$

where $\mathbb{E}$ denotes an expectation operator, $\mathcal{F}:\mathcal{X}\rightarrow\mathcal{Z}_C$ is a content-specific encoder function that maps the sample x to its content-specific feature $z_C$, and $\mathcal{T}:\mathcal{D}\times\mathbb{R}^n\rightarrow\mathcal{Z}_S$ is a style-specific generator function (where $\mathcal{D}$ indicates a domain label space and $\mathbb{R}^n$ indicates an n-dimensional set of real numbers) that takes a domain index d and maps an n-dimensional probability vector (e.g. a Gaussian vector) u$\in$ $\mathbb{R}^n$ (where u has the distribution $\mathcal{N}(0,I)$) to a point on $\mathcal{Z}_S$ of domain d.

$\mathbb{D}(p_1,p_2)$ denotes a distance measure between two probability vectors $p_1$ and $p_2$. The $L_1$ distance (e.g., the absolute values of the difference between the classifier's probabilistic outputs) may be used as:

$$\mathbb{D}(p_1,p_2) = \sum_{i=1}^{K} |p_1^k - p_2^k|, \tag{7}$$

where $$p_1^k$$

$$p_2^k$$

denote a probability output of $p_1$ and $p_2$ for class k, respectively. However, any distance measure for distributions may be used in place of the $L_1$ distance. Thus, domain invariant regularization may encourage a classifier f to be invariant to induced semantically irrelevant perturbations in the input data (e.g., images) that may arise from altering the input samples through style perturbations. These perturbations to the input may use a disentangled latent feature that may encode independent controllable factors, for example, where style-specific factors are known to be independent from the class label. Thus, a domain invariant regularization classifier $f^*$ may k written as $$f^* = \arg\min_f \mathcal{L}_{cls} + \lambda\mathcal{L}_{reg} \tag{8}$$

where $\lambda$ may be a hyper-parameter that may control a trade-off between the prediction accuracy of the classifier $f^*$ on the source samples and the consistency of the classifier $f^*$ over the sample perturbations, and $\mathcal{L}_{cls}$ denotes a multi-class cross-entropy loss function given by $$\mathcal{L}_{cls}=\mathbb{E}_{(x,y)\sim\mathbb{P}(x,y)}[-\log([f(x)]_y)] \tag{9}$$

where $[a]_i$ returns the i-th coordinate of a.

Figure 6:
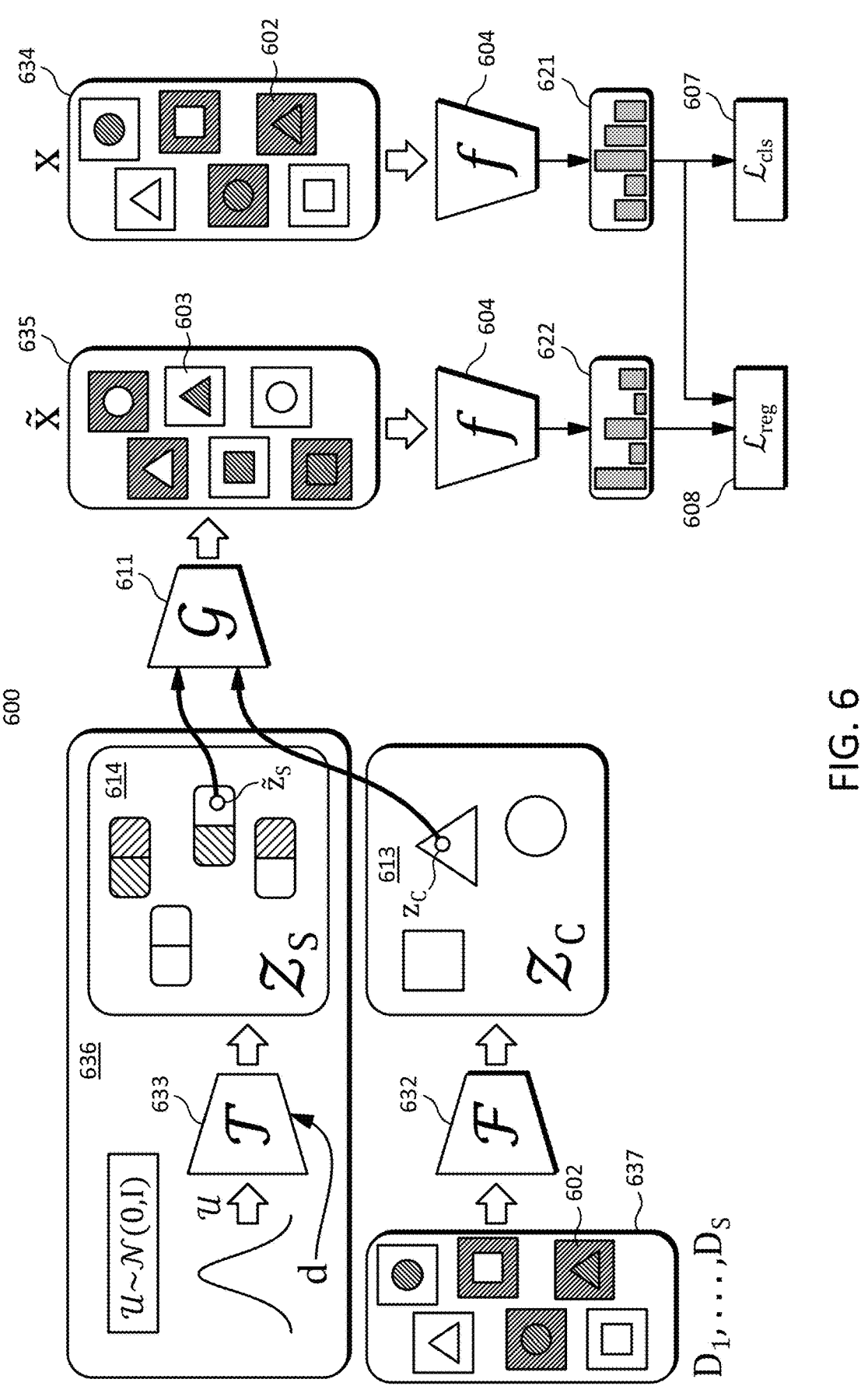
FIG. 6 depicts a system for generating disentangled content-specific and domain-specific features to generate training images and training a machine learning model to be domain invariant according to an embodiment.

FIG. 6 depicts a system for generating disentangled content-specific and domain-specific features to generate training images and training a machine learning model to be domain invariant according to an embodiment. The system 600 depicted in FIG. 6 may be used, for example, to implement any of the systems 100, 200, 300, or 400 discussed above or any other embodiment disclosed herein.

Referring to FIG. 6, the system 600 may include a content-specific encoder $\mathcal{F}$ indicated as $\mathcal{T}$ 632 and style selector 636 including a domain-specific (e.g., style-specific) generator $\mathcal{T}$ indicated as 633. The content-specific encoder $\mathcal{F}$ may extract a content-specific feature $z_C$ from a source sample image x (indicated as 602) obtained from one of S source domains {$D_1, \ldots, D_S$} indicated as 637. The domain-specific generator $\mathcal{T}$ may randomly select a style-specific feature $\tilde{z}_S$ from a style-specific feature space $\mathcal{Z}_S$ indicated as 614. The content-specific feature $z_C$ and style-specific feature $\tilde{z}_S$ may be applied to a generator model $\mathcal{G}$ (indicated as 611) to generate a new semantically preserved sample image $\tilde{x}$ (indicated as 603) having the same content as x.

The original sample image x (indicated as 602) may be applied to a classifier 604 which may compute an output (e.g., class prediction) $f(x)$ that, in this example, may be implemented as a probability vector 621. The new (semantically preserved) image $\tilde{x}$ (indicated as 603) may be applied to the classifier 604 which may compute an output (e.g., class prediction) $f(\tilde{x})$ that, in this example, may be implemented as a probability vector 622. The classifier 604 is depicted multiple times in FIG. 6 to illustrate its use with the different training images x and $\tilde{x}$.

The classifier output $f(x)$ based on the first training image x may be applied to a cross-entropy loss function 607 to compute a cross-entropy loss $\mathcal{L}_{cls}$. The classifier output $f(\tilde{x})$ based on the second training image $\tilde{x}$ may be applied to a domain invariant regularization loss function 608. In some implementations, the classifier output $f(x)$ based on the first training image x may also be applied to the domain invariant regularization loss function 608 which may compute a domain invariant regularization loss $\mathcal{L}_{reg}$ based on the classifier outputs $f(x)$ and $f(\tilde{x})$.

Thus, the classifier f (indicated as 604) may be trained using two losses. The cross-entropy loss $\mathcal{L}_{cls}$ may cause the classifier f to predict the correct class label for image x, whereas the domain invariant regularization loss $\mathcal{L}_{reg}$ may cause the classifier f to make similar predictions for images x and $\tilde{x}$.

The operations of the content-specific encoder $\mathcal{F}$, the domain-specific generator $\mathcal{T}$, the generator mode $\mathcal{G}$ (which may also be referred to as an image generator), and the classifier $f$ as described above may be repeated with other source sample images x obtained from the source domains 637 to train the classifier $f$. For example, any or all of the source sample images x obtained from the source domains 637 may be used as inputs 634 to classifier $f$ along with their corresponding newly generated semantically preserved images $\tilde{x}$ (indicated as 635). Alternatively, or additionally, instead of applying a source sample image x obtained from one of the source domains 637 directly to the classifier $f$, the content-specific feature $z_C$ extracted by the content-specific encoder $\mathcal{F}$ may be combined with the style-specific feature $z_S$ for the source domain by the image generator $\mathcal{G}$ to reconstruct the source sample image x, before applying it to the classifier $f$.

The content-specific encoder $\mathcal{F}$ may implement a mapping $\mathcal{F}: \mathcal{X} \to \mathcal{Z}_C$ that may map a source sample image x to its content-specific feature $z_C$, by extracting the content-specific feature $z_C$ from the image x. In some implementations, the extracted content-specific feature $z_C$ may be added to the collection of content-specific feature $z_C$ in the content-specific feature space $\mathcal{Z}_C$ (indicated as 613). Additionally, or alternatively, the extracted content-specific feature $z_C$ may be used to generate more training images such as the training images 412 depicted in FIG. 4B.

The domain-specific generator $\mathcal{T}$ may implement a mapping $\mathcal{T}: \mathcal{D} \times \mathbb{R}^n \to \mathcal{Z}_S$ where $\mathcal{D}$ indicates a domain label space and $\mathbb{R}^n$ indicates an n-dimensional set of real numbers. The domain-specific generator $\mathcal{T}$ may randomly select a domain index d and map an n-dimensional probability vector (e.g., a Gaussian vector) $u \in \mathbb{R}^n$ (where u has the distribution $\mathcal{N}(0,I)$) to a point on $\mathcal{Z}_S$ of domain d to generate a randomly selected style-specific feature $\tilde{z}_S$.

In an embodiment, the content-specific encoder $\mathcal{F}$, the domain-specific generator $\mathcal{T}$, and the image generator $\mathcal{G}$ may be pretrained and then fixed during the training of the classifier 604.

Figure 7:
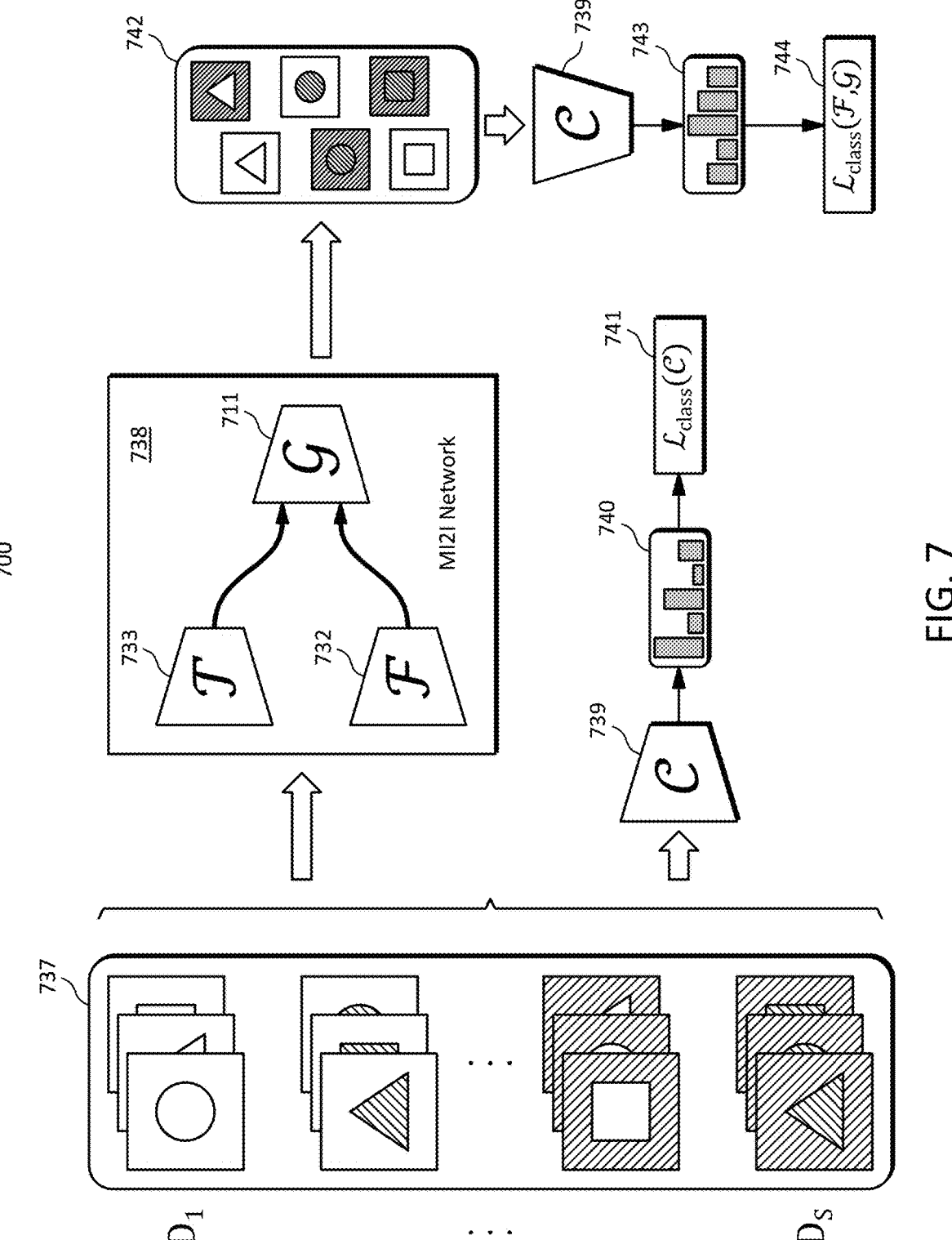
FIG. 7 depicts a system for training a content-specific encoder, a domain-specific generator, and/or an image generator according to an embodiment.

FIG. 7 depicts a system for training a content-specific encoder, a domain-specific generator, and/or an image generator according to an embodiment. The system 700 may include a multi-domain image-to-image translation network (MI2I network) 738. The MI2I network 738 may include content-specific encoder $\mathcal{F}$ indicated as 732, a domain-specific generator $\mathcal{T}$ indicated as 733, and an image generator $\mathcal{G}$ indicated as 711. The MI2I network 738 may perform a disentangled feature extraction function to recover the style-specific and content-specific features of input images. The MI2I network 738 may also perform an image generation function in which, given a sample image x and a target domain d, generates an image in domain d using an extracted content feature of x and a randomly generated style feature in domain d. Thus, MI2I network 738 may be well-suited to training the content-specific encoder $\mathcal{F}$, the domain-specific generator $\mathcal{T}$, and the image generator $\mathcal{G}$ in the system 600 depicted in FIG. 6.

Referring to FIG. 7, the MI2I network 738 may be used by itself to generate diverse training images from S source domains $\{D_1, \ldots, D_S\}$ indicated as 737 (which may be the same as, or similar to the S source domains $\{D_1, \ldots, D_S\}$ indicated as 637 in FIG. 6). However, without access to classification information for the source domains, the MI2I network 738 may generate arbitrary mappings because it may translate images without supervision between domains that share common semantic attributes (e.g. class labels). For example, if the MI2I network 738 is provided with an input image of a dog (content-specific feature) in a sketch style (domain-specific feature), it may generate an image of a cat in a sketch style. Thus, it may mistranslate the content.

However, when used with any of the training systems described herein, class information for sample images x from the source domains 737 may be known and used to improve the training of the MI2I network 738. Therefore, the system 700 may include a classifier $\mathcal{C}: \mathcal{X} \to \mathcal{Y}$ indicated as 739. The classifier C may be trained to classify sample images x from the source domains 737 using the available class information. Once the classifier $\mathcal{C}$ is trained, it may then be used to train the content-specific encoder $\mathcal{F}$, the domain-specific generator $\mathcal{T}$, and/or the image generator $\mathcal{G}$ indicated in the MI2I network 738.

For example, as shown in FIG. 7, for sample images x from the source domains 737, the classifier $\mathcal{C}$ may compute outputs in the form of probability vectors 740 that ma be applied to a loss function (e.g., a cross-entropy loss function) 741 to generate a classification loss $\mathcal{L}_{class}(\mathcal{C})$ that may be used to provide training feedback to the classifier $\mathcal{C}$. Thus, the classifier $\mathcal{C}$ may be trained using at least some of the actual source domain images that may be used to train the content-specific encoder $\mathcal{F}$, the domain-specific generator $\mathcal{T}$, and/or the image generator $\mathcal{G}$ in the MI2I network 738.

Once the classifier $\mathcal{C}$ is trained, the MI2I network 738 may use the same and/or other sample images x from the source domains 737 to generate domain-translated (e.g., semantically preserved) images 742 that may be applied to the classifier $\mathcal{C}$ to compute outputs in the form of probability vectors 743. The probability vectors 743 may be applied to a loss function (e.g., a cross-entropy loss function) 744 to generate a classification loss $\mathcal{L}_{class}(\mathcal{F}, \mathcal{G})$ that may be used to provide training feedback (e.g., using gradient descent, backpropagation, and/or the like) to the content-specific encoder $\mathcal{F}$, the domain-specific generator $\mathcal{T}$, and/or the image generator $\mathcal{G}$ indicated in the MI2I network 738. Thus, the trained classifier $\mathcal{C}$ be used to impose constraints on $\mathcal{F}$, $\mathcal{T}$, and/or $\mathcal{G}$ to cause them to generate domain-translated images 742 having the same class (and therefore, content) as the sample images x used to generate the domain-translated images 742. Thus, the system 700 may incorporate categorical semantics into the MI2I network 738 to train $\mathcal{F}$, $\mathcal{T}$, and/or $\mathcal{G}$ to translate input images to new domains belonging to their own classes by encouraging them to minimize the loss on the generated images.

The classifier $\mathcal{C}$ is depicted multiple times in FIG. 7 to illustrate it being trained (e.g., using the loss $\mathcal{L}_{class}(\mathcal{C})$) and being used to train $\mathcal{F}$, $\mathcal{T}$, and/or $\mathcal{G}$ in the MI2I network 738 (e.g., using the loss $\mathcal{L}_{class}(\mathcal{F}, \mathcal{G})$).

In some implementations, $\mathcal{T}$ may be considered a style generator function of the MI2I network 738, and $\mathcal{G}(\mathcal{F}(.))$ may be considered an image generator function of the MI2I network 738. Given an image x and its domain label d, any number of the following objective functions of the MI2I network 738 may be implemented for training $\mathcal{F}$, $\mathcal{T}$, and/or $\mathcal{G}$.

Domain Adversarial objective: During training, a latent code u~$\mathcal{N}$ (0,I) and a target domain d may be randomly sampled to generate a target (domain-specific) style code is $\tilde{z}_s = \mathcal{T}(u,d)$. $\mathcal{F}$ and $\mathcal{G}$ may be trained to generate an output image $\tilde{x} = \mathcal{G}(\mathcal{F}(x), \tilde{z}_s)$ via an adversarial loss using a domain discriminator $\mathcal{D}$. $\mathcal{T}$ may learn to provide a style code $\tilde{z}_s$ that is likely in the target domain d, and g may be trained to utilize $\tilde{z}_s$ and generate an image that may be indistinguishable from real images of the domain d. The domain adversarial loss may be formulated as $$\mathcal{L}_{adv} = \mathbb{E}_{x,d}[\log D_d(x)] + \mathbb{E}_{x,\tilde{d},u}[\log(1-D_d(\tilde{x}))],$$

$$x = \mathcal{G}(\mathcal{F}(x), \mathcal{T}(u,\tilde{d})) \quad (10)$$

where $D_d(.)$ may denote the output of the discriminator D corresponding to the domain d.

Style reconstruction Objective: To enforce the generator module to utilize the style code $\tilde{z}_s$ when generating the image $\tilde{x}$, a style reconstruction loss may be employed to learn a mapping E from an image to its style code. The style reconstruction loss may be written as $$\mathcal{L}_{sty} = \mathbb{E}_{x,\tilde{d},u}[\|\tilde{z}_s - E_d(\tilde{x})\|_1], \ \tilde{x} = \mathcal{G}(\mathcal{F}(x), \tilde{z}_s = \mathcal{T}(u,\tilde{d}), \quad (11)$$

where $E_d(.)$ may denote the output of the mapping network E corresponding to the domain d.

Style diversification Objective: To enable a generator module to produce diverse images, $\mathcal{F}$ and $\mathcal{G}$ may be regularized with a diversity sensitive loss. The regularization term may encourage or force $\mathcal{F}$ and $\mathcal{G}$ to explore the image space and discover meaningful style features to generate diverse images. The style diversification loss can be expressed as $$\mathcal{L}_{sd} = \mathbb{E}_{x,\tilde{d},u_1,u_2}[\|\mathcal{G}(\mathcal{F}(x),z_1) - \mathcal{G}(\mathcal{F}(x),z_2)\|_1],$$

$$z_1 = \mathcal{T}(u_1,\tilde{d}), \ z_2 = \mathcal{T}(u_2,\tilde{d}), \quad (12)$$

Cycle Consistency Objective: To cause a generated image $\tilde{x}$ to properly preserve the domain invariant characteristics (e.g. shape) of its input image x, a cycle consistency loss may be used. This loss may encourage the generator module to preserve the original characteristics of x while changing its style reliably. This loss can be represented as $$\mathcal{L}_{cyc} = \mathbb{E}_{x,d,\tilde{d},u}[\|x - \mathcal{G}(\mathcal{F}(\tilde{x}),s)\|_1],$$

$$\tilde{x} = \mathcal{G}(\mathcal{F}(x), \mathcal{T}(u,\tilde{d})), \ s = E_d(x). \quad (13)$$

Category Classification Objective: Although some MI2I models may learn accurate and diverse transformations between multiple source domains, they may also result in arbitrary mappings as translations may be performed without supervision between domains that share common semantic attributes (e.g. class labels). Some MI2I models may be applied on domains in which a translation may entail small geometric changes and the style of the generated image may be independent of the semantic content in the source sample (e.g., translating horses to zebras). To exploit category labels of source samples, a classification module $\mathcal{C} : \mathcal{X} \to \mathcal{Y}$ may be incorporated into an MI2I model as described above. This may be implemented by adding a classification loss function $\mathcal{L}_{class}$ into the MI2I model as follows:

$$\mathcal{L}_{class} = \mathbb{E}_{(x,y) \sim \mathbb{P}(x,y)}[-\log([\mathcal{C}(x)]_y], \quad (14)$$

During training of an MI2I model, the classifier may only be trained on the actual labeled source samples using the cross entropy loss. $\mathcal{F}$ and $\mathcal{G}$ may then be trained to translate input images to new domains belonging to their own classes by encouraging them to minimize the cross entropy loss on the generated images.

Full objective: The various objective functions for the MI2I model described above may be combined as follows:

$$\min_{\mathcal{G},\mathcal{F},\mathcal{T},\mathcal{C}} \max_{D} \mathcal{L}_{adv} + \lambda_{sty}\mathcal{L}_{sty} + \lambda_{cyc}\mathcal{L}_{cyc} - \lambda_{ds}\mathcal{L}_{ds} + \lambda_{class}\mathcal{L}_{class}, \quad (15)$$

where $\lambda_{sty}$, $\lambda_{cyc}$, $\lambda^{ds}$, and $\lambda_{class}$ may be hyperparameters for the different terms. In some implementations, during training of the MI2I model, the classifier $\mathcal{C}$ may only be trained on the actual labeled source samples, whereas $\mathcal{F}$ and $\mathcal{G}$ may be trained using the classification losses of generated samples as well as other MI2I loss functions.

Once T, F. and/or G are trained, a classifier $f$ (e.g., classifier 604 in FIG. 6) may be trained as follows. Given N training samples $$\{x_i, y_i, d_i\}_{i=1}^{N}$$

from S source domains, the expectations in Eq. (6) and (9) may be approximated with empirical average to obtain $f$ as $$f^* = \arg\min_{f} \frac{1}{N} \sum_{i=1}^{N} \left[ -\log([f(x_i)]_{yi}) + \lambda \sum_{j=1}^{M} D(f(x_i) - f(\hat{x}_j)) \right], \quad (16)$$

where $$\hat{x}_i = \mathcal{G}(\mathcal{F}(x_i), \mathcal{T}(\hat{d}_j, \hat{u}_j)), \ \hat{d}_j \sim U(\{1,2,\dots,S\}), \ \hat{u}_j \sim \mathcal{N}(0,I), \quad (17)$$

and $U_d(.)$ may denote a discrete uniform distribution over the index set $\{1, 2, \dots, S\}$. For each training image $x_i$, $f$ may be encouraged to (i) correctly predict its class label $y_i$, and (ii) provide a similar prediction with a set of M perturbed images $$\{\hat{x}_j\}_{j=1}^{N}$$

with the same content as $x_i$ under varying styles.

Figure 8:
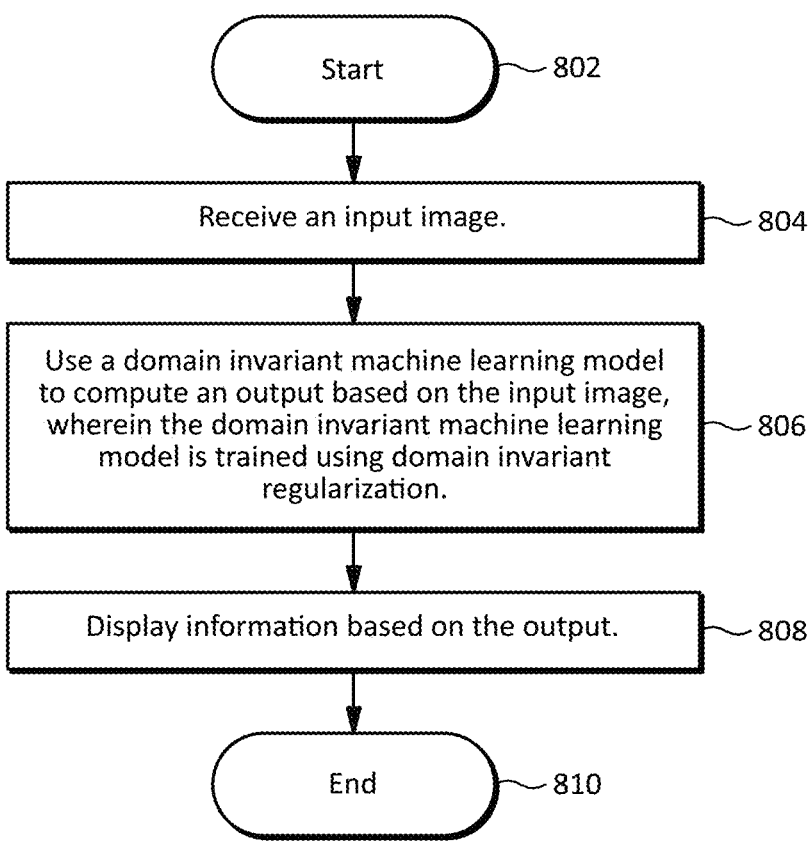
FIG. 8 depicts a method for using a domain invariant machine learning model according to an embodiment.

FIG. 8 depicts a method for using a domain invariant machine learning model according to an embodiment. The method may begin at operation 802. At operation 804, the method may receive an input image. At operation 806, the method may use a domain invariant machine learning model to compute an output based on the input image, wherein the domain invariant machine learning model is trained using domain invariant regularization. At operation 808, the method may display information based on the output. As an example, the method may be used as part of an image recognition application which classifies images for the purpose of image sorting, object recognition, or any other image classification approach. The displayed information may comprise an identification of the output, such as a classification of the input image, and/or a result of the image recognition output, such as a display of the image in a particular folder. The method may end at operation 810.

Figure 9:
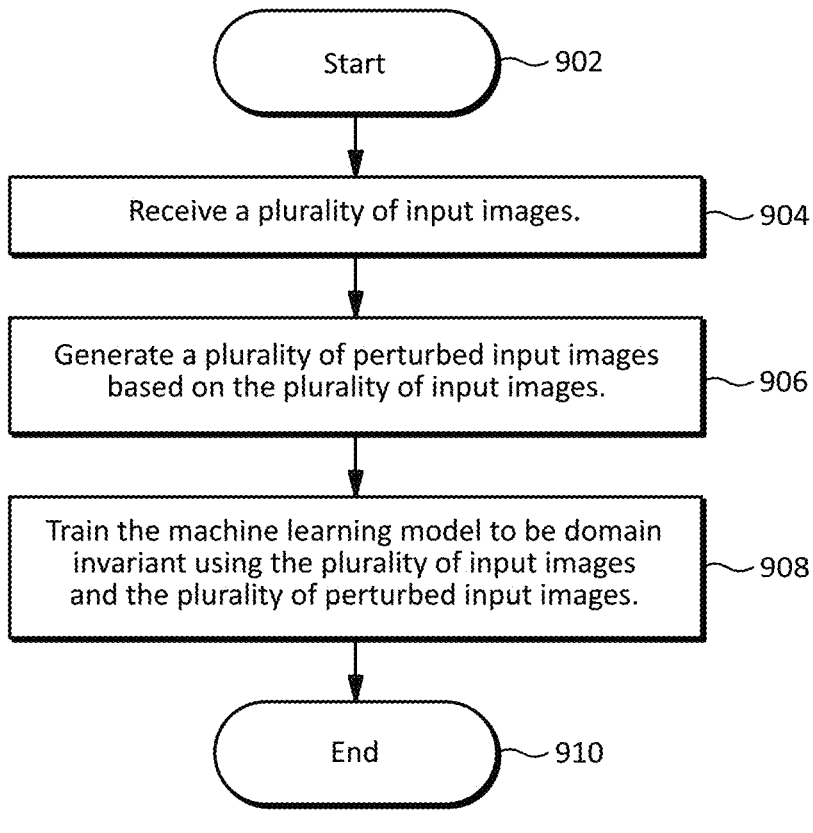
FIG. 9 depicts a method for training a machine learning model to be domain invariant according to an embodiment.

FIG. 9 depicts a method for training a machine learning model to be domain invariant according to an embodiment. The method may begin at operation 902. At operation 904, the method may receive a plurality of input images. At operation 906, the method may generate a plurality of perturbed input images based on the plurality of input images. At operation 908, the method may train the machine learning model to be domain invariant using the plurality of input images and the plurality of perturbed input images. The trained machine learning model may be used to perform image recognition tasks, such as according to the method of FIG. 8. The method of training the model may end at operation 910.

FIG. 10 is a block diagram of an electronic device in a network environment 100), according to an embodiment. The electronic device 1001 may be used to implement any of the systems, methods, or apparatus disclosed herein. For example, a domain invariant machine learning model and/or a domain invariant regularization loss may be implemented using any of the processors 1020, 1021, 1023, memory 1030, program 1040, and/or the like. One or more images may be received, for example, using any of the communication module 1090, input device 1050, camera module, 1080, and/or the like. Information based on an output of a domain invariant machine learning model may be displayed, for example, using any of the display device 1060, communication module 1090, and/or the like.

Referring to FIG. 10, an electronic device 1001 in a network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) card 1096, or an antenna module 1094. In one embodiment, at least one (e.g., the display device 1060 or the camera module 1080) of the components may be omitted from the electronic device 1001, or one or more other components may be added to the electronic device 1001. Some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute software (e.g., a program 1040) to control at least one other component (e.g., a hardware or a software component) of the electronic device 1001 coupled with the processor 1020 and may perform various data processing or computations.

As at least part of the data processing or computations, the processor 1020 may load a command or data received from another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). The auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. The display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. The audio module 1070 may obtain the sound via the input device 1050 or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wired) or wirelessly. The interface 1077 may include, for example, a high-definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. The connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. The haptic module 1079 may include, for example, a motor, a piezoelectric element, or an electrical stimulator.

The camera module 1080 may capture a still image or moving images. The camera module 1080 may include one or more lenses, image sensors, image signal processors, or flashes. The power management module 1088 may manage power supplied to the electronic device 1001. The power management module 1088 may be implemented as at least part of, for example, a power management integrated circuit (PMIC).

The battery 1089 may supply power to at least one component of the electronic device 1001. The battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. The communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. The antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

Commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs. i.e., one or more modules of computer-program instructions, encoded on computer-storage medium for execution by, or to control the operation of data-processing apparatus. Alternatively or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications according to the inventive principles of this patent disclosure. Accordingly, the scope of claimed subject matter should not be limited to any of the specific exemplary teachings discussed above, but is instead defined by the following claims.

What is claimed is:

1. A method comprising:
receiving an input image;
using a domain invariant machine learning model to compute an output based on the input image, wherein the domain invariant machine learning model is trained using domain invariant regularization comprising a style diversification loss function, wherein the domain invariant regularization uses a domain invariant loss function that accounts for a content-specific feature comprising subject information or category information and a domain-specific feature comprising specific style information of the input image;
displaying information based on the output; and
wherein the domain invariant machine learning model is trained to be invariant to domain-specific features using training images having disentangled content-specific and domain-specific feature spaces, the training images generated based on a multi-domain image-to-image translation network.

2. The method of claim 1, wherein the domain invariant regularization comprises using a domain invariant loss.

3. The method of claim 1, wherein the domain invariant machine learning model is trained using a first image of the training images, the first image comprising the content-specific feature and a first domain-specific feature and a second image of the training images, the second image comprising the content-specific feature and a second domain-specific feature.

4. The method of claim 3, wherein the second image is generated from the first image.

5. The method of claim 3, wherein the domain invariant machine learning model is trained by using a classification loss for the first image, using a domain invariant loss for the second image, and combining the classification loss and the domain invariant loss.

6. The method of claim 3, wherein the second image is generated using an image generator.

7. The method of claim 6, wherein the image generator is trained using a classifier model.

8. A system comprising:
one or more processors;
a memory storing instructions which, when executed by the one or more processors, causes a domain invariant machine learning model to compute an output based on an input image, wherein the domain invariant machine learning model is trained using domain invariant regularization comprising a style diversification loss function and a loss function implemented using a distance function, wherein the domain invariant regularization uses a domain invariant loss function that accounts for a content-specific feature comprising subject information or category information and a domain-specific feature comprising specific style information of the input image; and
wherein the domain invariant machine learning model is trained to be invariant to domain-specific features using training images having disentangled content-specific and domain-specific feature spaces, the training images generated based on a multi-domain image-to-image translation network.

9. The system of claim 8, wherein the domain invariant regularization comprises using a domain invariant loss.

10. The system of claim 8, wherein the domain invariant machine learning model is trained using a first image of the training images, the first image comprising the content-specific feature and a first domain-specific feature and a second image of the training images, the second image comprising the content-specific feature and a second domain-specific feature.

11. The system of claim 10, wherein the second image is generated from the first image.

12. The system of claim 10, wherein the domain invariant machine learning model is trained by using a classification loss for the first image, using a domain invariant loss for the second image, and combining the classification loss and the domain invariant loss.

13. The system of claim 10, wherein the second image is generated using an image generator.

14. The system of claim 13, wherein the image generator is trained using a classifier model.

15. A method of training a machine learning model, the method comprising:
receiving a plurality of input images;

generating a plurality of perturbed input images based on the plurality of input images, wherein the plurality of perturbed input images are generated based on a combination of a content-specific feature comprising subject information or category information and a domain-specific feature comprising specific style information of the plurality of input images;

training the machine learning model to be domain invariant using the plurality of input images, the plurality of perturbed input images, a style diversification loss function, and a loss function implemented using an expectation function; and where in the machine learning model is a domain invariant machine learning model trained to be invariant to domain-specific features using training images having disentangled content-specific and domain-specific feature spaces, the training images generated based on a multi-domain image-to-image translation network.

16. The method of claim 15, wherein training the machine learning model to be domain invariant comprises using a domain invariant loss.

17. The method of claim 16, wherein training the machine learning model to be domain invariant comprises:

computing a classification loss for one of the plurality of input images;

computing the domain invariant loss for one of the plurality of perturbed input images; and combining the classification loss and the domain invariant loss.

18. The method of claim 15, wherein one of the plurality of input images comprises the content-specific feature and a first domain-specific feature, and generating the plurality of perturbed input images comprises combining the content-specific feature with a second domain-specific feature.

19. The method of claim 15, wherein the plurality of perturbed input images are generated using an image generator.

20. The method of claim 19, wherein the image generator is trained using a classifier model.

\* \* \* \* \*